(12) United States Patent
Paltakari

(10) Patent No.: US 9,982,100 B2
(45) Date of Patent: May 29, 2018

(54) ACOUSTIC PRODUCT COMPOSED OF COMPOSITE MATERIAL

(71) Applicants: OY ALL-PLAST AB, Heinävaara (FI); FLAXWOOD OY, Heinävaara (FI)

(72) Inventor: Jouni Paltakari, Espoo (FI)

(73) Assignees: OY ALL-PLAST AB, Heinavaara (FI); FLAXWOOD OY, Heinavaara (FI)

( * ) Notice: Subject to any disclaimer, the term of this patent is extended or adjusted under 35 U.S.C. 154(b) by 0 days. days.

(21) Appl. No.: 15/305,775

(22) PCT Filed: Apr. 22, 2015

(86) PCT No.: PCT/FI2015/050275
§ 371 (c)(1),
(2) Date: Oct. 21, 2016

(87) PCT Pub. No.: WO2015/162337
PCT Pub. Date: Oct. 29, 2015

(65) Prior Publication Data
US 2017/0044335 A1 Feb. 16, 2017

(30) Foreign Application Priority Data

Apr. 23, 2014 (FI) ..................................... 20145374

(51) Int. Cl.
| | |
|---|---|
| *C08L 1/00* | (2006.01) |
| *C08J 5/06* | (2006.01) |
| *G10D 1/00* | (2006.01) |
| *C08J 5/00* | (2006.01) |
| *G10D 7/00* | (2006.01) |
| *B29K 201/00* | (2006.01) |

(52) U.S. Cl.
CPC ............... *C08J 5/06* (2013.01); *C08J 5/005* (2013.01); *G10D 1/005* (2013.01); *G10D 7/005* (2013.01); *B29K 2201/00* (2013.01); *C08J 2300/22* (2013.01); *C08J 2401/02* (2013.01)

(58) Field of Classification Search
CPC . C08J 5/06; C08J 5/005; C08J 2300/22; C08J 2401/02
USPC .......................................................... 524/35
See application file for complete search history.

(56) References Cited

U.S. PATENT DOCUMENTS

| | | |
|---|---|---|
| 4,364,990 A | 12/1982 | Haines |
| 4,429,308 A | 2/1984 | Kaman et al. |
| 4,818,604 A | 4/1989 | Tock |
| 5,686,680 A | 11/1997 | Laurence |
| 2006/0032358 A1 | 2/2006 | Rautia et al. |
| 2006/0042447 A1 | 3/2006 | Schleske |
| 2010/0193116 A1 | 8/2010 | Gamstedt et al. |
| 2012/0090800 A1* | 4/2012 | Ture ............... B29C 70/465 162/164.1 |

FOREIGN PATENT DOCUMENTS

| | | | |
|---|---|---|---|
| JP | 2008197450 A | * | 8/2008 |
| WO | 2008121069 A1 | | 10/2008 |
| WO | 2014034071 A1 | | 2/2014 |
| WO | 2014068166 A1 | | 5/2014 |
| WO | 2015162337 A1 | | 10/2015 |

OTHER PUBLICATIONS

Translation of JP 2008-197450, Aug. 28, 2008.*
Written Opinion of the International Searching Authority in PCT Application Serial No. PCT/FI2015/050275 dated Aug. 21, 2015.
Rule 70(2) and 70a(2) EPC issued in counterpart European Patent Application Serial No. 15782926.8 dated Nov. 24, 2017.

* cited by examiner

*Primary Examiner* — Hui Chin
(74) *Attorney, Agent, or Firm* — Brian J. Colandreo; Michael T. Abramson; Holland & Knight LLP

(57) ABSTRACT

The invention relates to an acoustic product composed of composite material, such as a musical musical instrument, a part thereof, an acoustic equipment or like, which is manufactured from raw material comprising at least cellulose based substance and plastic based substance by means of a thermoplastic process, such as by pressing, compression molding, injection molding, extrusion, blow molding by heat, rotational molding and/or the like. The acoustic product has a material composition consisting of fiber substance (1) based on surface modified cellulose and plastic based substance (2), wherein the product has an essentially wood-like, but isotropic sound.

17 Claims, 5 Drawing Sheets

Figure 2:
Figure 2:

FIG. 1a
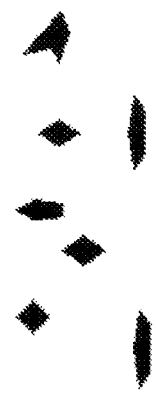
FIG. 1b
 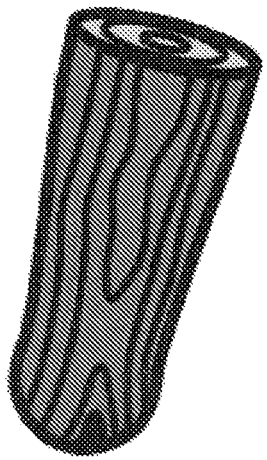

ACOUSTIC PRODUCT COMPOSED OF COMPOSITE MATERIAL

RELATED APPLICATIONS

This application is a U.S. national stage application of International Application No. PCT/FI2015/050275, filed on Apr. 22, 2015, entitled "An Acoustic Product Composed of Composite Material," which claims the benefit of Finish Patent Application No. 20145374, filed on Apr. 23, 2014, the entire contents of which are incorporated herein by reference.

The invention relates to an acoustic product composed of composite material, which is defined in greater detail in the preamble of the independent claim related thereto.

The variety of materials used in musical instruments is great. In addition to wood, different kinds of metals, plastics and composite materials are used. Of all the materials wood is, however, the oldest and most used. Availability and workability of wood with even the simplest tools has enabled the musical instruments to be developed. Beside wood there have since come musical instruments made of metal, such as brass musical instruments and drums. New composite solutions are used in building of musical instruments when building among other things violins and percussion musical instruments and guitars. At present also carbon and fiberglass based composites and newer wood fiber based composites are used in building of musical instruments.

Technically, regarding the behavior of sound, wood is an anisotropic material due to the grain structure of wood. The direction of the grain in musical instruments is chosen profitable with respect to the propagation of sound, because transverse propagation of sound with respect to the grains is typically ⅓-⅕ of the propagation along the direction of the grains. By choosing the direction of the grain correctly, the effect of disadvantageous directions with respect to sound propagation in the musical instruments can be minimized. With respect to sound propagation, the transverse directions with respect to the grain structure dampen and decelerate the resonance of the musical instrument throughout the instrument. Cellulose fiber, however, gives wood instruments their typical, pleasant soft tone.

Metals may be considered as isotropic materials with respect to the behavior of sound, because in them the propagation of sound in three dimensions is almost the same regardless of the direction. This makes possible for the material to react fast to the sound especially in the most difficult forms, especially in rotational symmetric bits (e.g. drums, brass instruments), and makes faster the response of the musical instrument to playing. The tone of metal instruments is thus harder and clearer, but they lack the acoustic softness that is characteristic to wood.

Glass- and carbon fiber structures have been tried in solving the weaknesses of transversely directed acoustic characteristics of wood. Especially the relative lightness and stiffness of carbon fiber composite has been proven advantageous in many musical instruments (e.g. violins, cellos). With knitted fiber structures the propagation of sound can be directed strongly in two different directions, but still the propagation of sound therein is not three dimensional, in addition to which they lack the acoustic softness that is characteristic to wood. In addition, the use of these kinds of materials is typically very hand crafted, wherein it is impossible to produce large series production with reasonable costs.

As an example of uses of the invention may be mentioned percussion musical instruments, such as drums, the body and rim of which are especially meaningful with respect to the tone of the drum, because the drum has to sound audibly and be sensitive to the touch of the sticks. Building of bodies today is still quite complicated, because first of all the wood body thereof is typically made by bending and gluing multiple wood ply layers on top of each other, or by working them out of solid wood. Respectively, the rim of the drum is typically crafted out of metal. Therefore, drums are thus a combination of isotropic and anisotropic materials with which optimal drum tone cannot be achieved.

Composite materials based on natural fibers have nowadays been based on dry grounded cellulose and/or on mixtures of wood powder and different thermoplastics. Of these, wood powder is problematic due to the shape and surface characteristics of its particles. These are due to the fact that wood powder particles form their own uninterruptedly continuing phase inside the thermoplastic, wherein they functioning thus only as filling substances, merely undermine achievement of producing the important characteristics of musical instruments, such as stiffness and optimal propagation of sound. Instead, the use of natural fibers has been proven to significantly increase the quality of thermoplastic composites in musical instrument embodiments.

In this context, especially in the application publication US 2006/0032358 is presented the use of natural fibers among with plastic in producing an acoustic composite material in a way that in injection molding the fibers may be directed in an advantageous direction. Thus, a sound directing anisotropic composite structure is produced, with which the same kind of oriented structure as with wood is strived for. A composite material oriented in this manner, however, propagates the sound strongly like wood only in the direction of the fibers. The material is thus anisotropic and the propagation of sound is, alike wood, weak in any other direction than along the orientation.

On the other hand in the application publication US 2012/0090800 is presented an intermediate product based on so called wet web formation and the manufacturing method thereof, in connection with which the fiber raw material and matrix plastic are being combined with the help of chemicals by utilizing, if needed, so called compatibility improving agents. The composite produced in the manufacturing of the intermediate product by wet web formation is fed into an extruder along with other possibly necessary substances, such as e.g. coloring agents or the like, wherein they are mixed together and pressed to a tight mass in the cylinder of the extruder, having a screw therein, with which the mass is being fed through a nozzle e.g. to be pelletized. Natural fiber composite pellets or granulates are being used in plastic industry commonly as a raw material for manufacturing different kinds of products e.g. by injection molding, extrusion and film blowing.

Despite the today's technique, a sufficiently satisfying level especially with respect to musical instruments' optimal tone has not been achieved with acoustic products, such as e.g. with the above mentioned percussion musical instruments or equipment thereof, because e.g. the good acoustic characteristics of metal and wood have not successfully been able to combine.

It is an aim of the acoustic product composed of composite material according to the present invention to achieve a decisive improvement in the problems described above and thus to raise essentially the level of prior art. In order to carry out this aim, the acoustic product composed of composite material according to the present invention is mainly characterized in that it has a material composition based on surface modified cellulose consisting of fiber substance and plastic based substance, wherein the product has essentially wood-like, but isotropic sound.

As the most important advantages of the invention may be mentioned first of all that is enables an acoustically completely new kind of a composite material that is by its acoustic nature or other characteristics like wood, but isotropic, and on the other hand the simplicity and efficiency of the stock of equipment related to the manufacturing of the material according to the invention. The composite material according to the invention differs from earlier composite materials in that that the orientation of the material has been managed to fade out, wherein the acoustic characteristics (e.g. the propagation of sound) and the hardness qualities of the composite material are almost proportional three dimensionally. The invention enables thus a composite structure that resembles homogeneous metal structures by its acoustic characteristics, but which is by its composition a mixture of thermoplastic and surface modified cellulose fiber substance. This can be achieved by grinding open the primary wall of the cellulose fibers by wet grinding, wherein the microfibrils in secondary layer thereof can be reached. Thanks to the fibrils, the reactive surface area of the cellulose fibers rises significantly, which furthermore enables a mixture, wherein a percolation between fibers is reached with e.g. 30-50% weight portion. Reaching the percolation threshold means that each fiber is in touch with all other fibers through other fibers. In this manner an IPN (interpenetrating network)-structure continuing through a piece can be formed. Respectively, molten plastic fills the space between the fibers thus forming an IPN-structure of its own. Therefore the material has particularly two IPN-structures. These two IPN-structures fade out the sound orientating characteristic of the material, thanks to which an acoustically isotropic composite is formed.

With the product according to the invention, a three dimensionally larger propagation of sound is achieved in musical instruments, which makes a musical instrument react more sensitively and also to resonate better throughout. Nevertheless, it is possible to maintain a warmer sound compared to metal thanks to the density of the material composition. By virtue of the invention, it is therefore possible to combine the best acoustic characteristics of metal and wood, wherein a sensitive and well resonating, but warm sound is resulted.

The product according to the invention can therefore be manufactured e.g. from a material that has at least two phases (a polymer and a surface modified cellulose fiber substance), the both of which form an IPN-structure of their own, because the fibrils, being "opened" out of the secondary wall of the cellulose fibers by wet grinding, improve the binding with (networking) each other and the polymer of the cellulose fibers and add their contact surface area. In this context, it is naturally also possible to utilize fibers that have been wet ground further, such as nanocellulose and nanowhiskers. Thanks to the IPN-structures, propagation of sound is directed in the material isotropically when compared to an oriented i.e. an anisotropic composite material. The surface modified cellulose being utilized in the product according to the invention cannot be found from nature, so it is actually not a natural fiber as such. On the other hand, a surface modified cellulose fiber differs from dry ground cellulose, because by dry grinding the primary wall cannot be erased selectively, due to which the fibril invention cannot be achieved, and therefore as a result no IPN-structure can be achieved, either.

Dry grinding cannot open the fibrils of a structure in a controlled manner, but instead the structure is broken and gets ground in smaller size mechanically. Thanks to the presence of water, the outer wall of the fiber faces on the cutting forces of the grind first, wherein the primary wall opens and the fiber gets thus to swell. The secondary wall takes inside a lot of water, because there the hemicellulose concentration is the highest. Thereafter the fibrillated structure of the fiber gets to be released and opened close to the surface of the fiber.

In the dependent claims related to the product composed of composite material according to the invention other advantageous embodiments of the invention have been presented.

Figure 3:
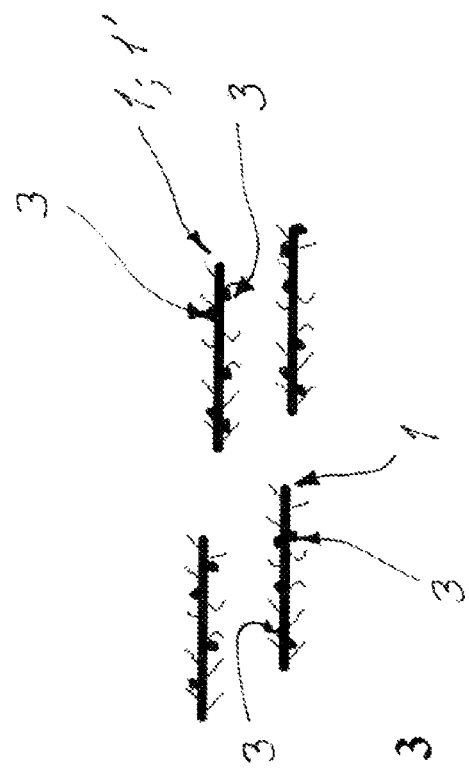
Figure 4:
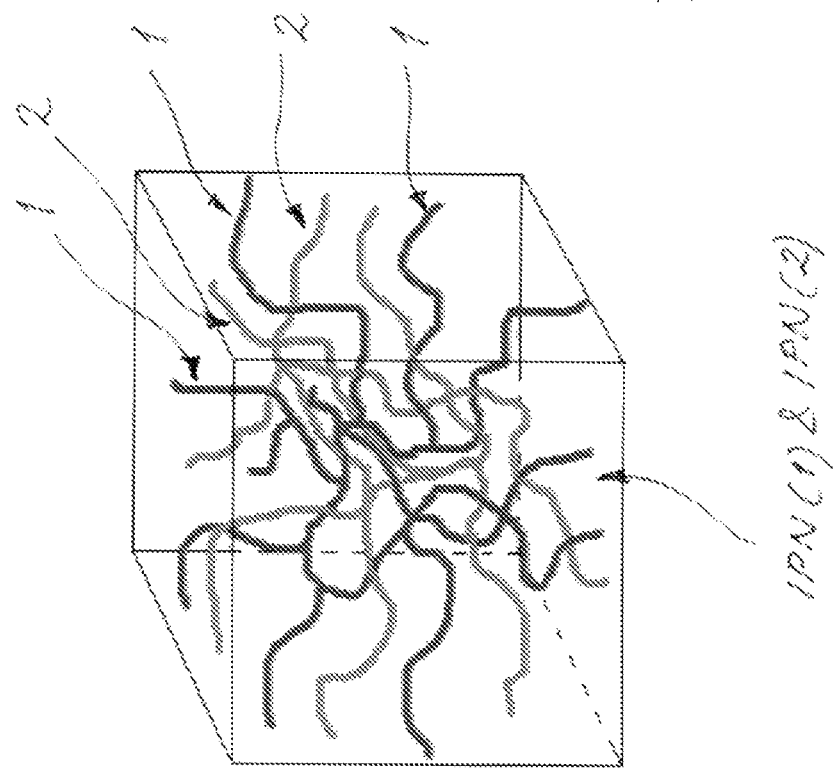
Figure 5:
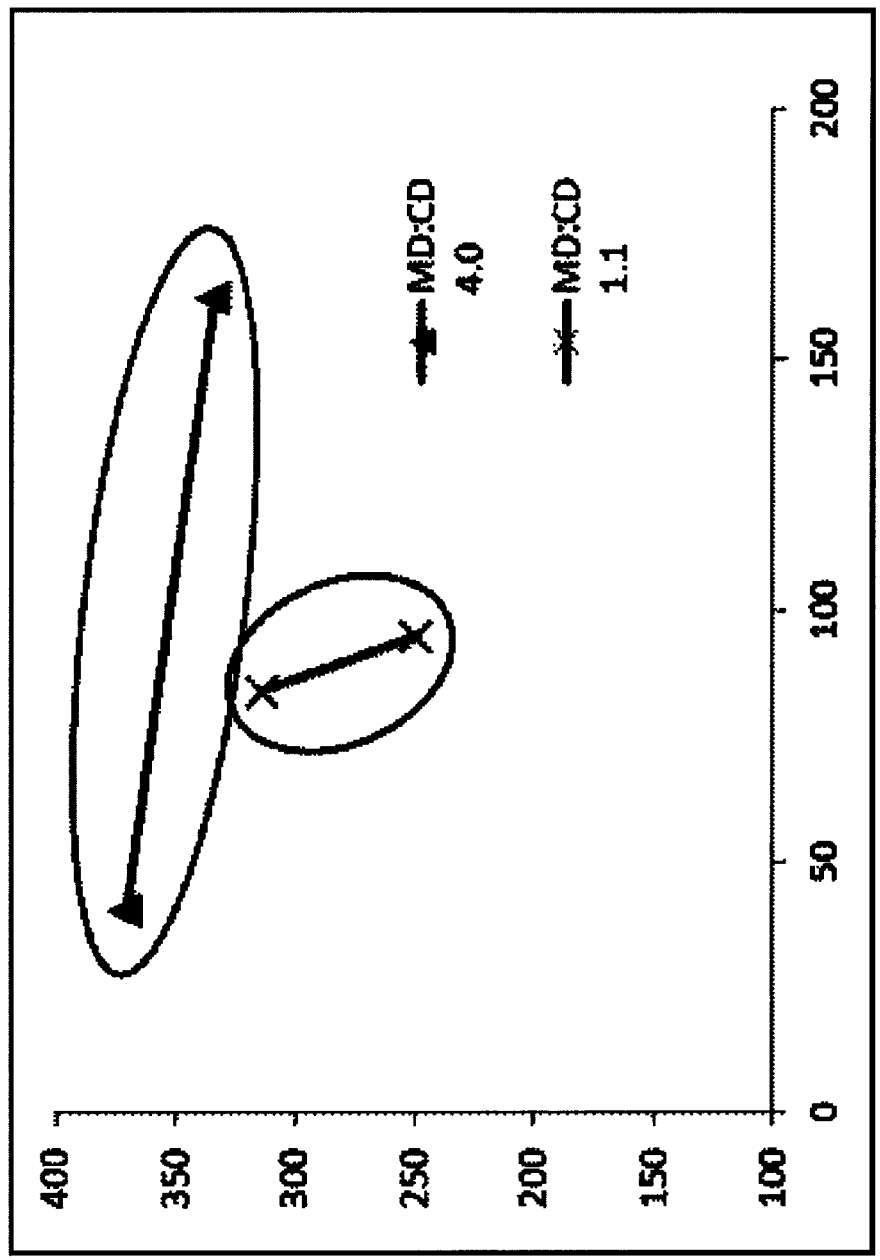

In the following description, the invention is being illustrated in detail with reference to the appended drawings, in which in FIGS. 1a and 1b are shown the morphology of traditionally handled wood, in FIG. 2 is shown the morphology of the surface modified cellulose fiber utilized in the product according to the invention, in FIG. 3 is shown an advantageous solution regarding the manufacturing of the product according to the invention, in FIG. 4 is shown the IPN-structure of the composite material that forms the product according to the invention, and in FIG. 5 is shown a experimental measurement result of the physical properties of a composite material by varying the fiber orientation thereof.

The invention relates to an acoustic product composed of composite material, such as a musical musical instrument, a part thereof, an acoustic equipment or like, which is manufactured from raw material comprising at least cellulose based substance and plastic based substance by means of a thermoplastic process, such as by pressing, compression molding, injection molding, extrusion, blow molding by heat, rotational molding and/or the like. The acoustic product has a material composition consisting a fiber substance 1 based on surface modified cellulose, e.g. according to the one shown in FIGS. 2 and 3, and plastic based substance 2, wherein the product has an essentially wood-like, but isotropic sound.

As an advantageous embodiment of the acoustic product according to the invention, it has a percolation as described above that at least partly goes through its material in the form of a continuous network (IPN/interpenetrating network) formed by the surface modified cellulose fibers 1.

As a furthermore advantageous embodiment of the acoustic product according to the invention, a space, being left between the surface modified cellulose fibers 1 in the material, is filled with plastic substance 2 that forms a continuous network IPN. In this context, as a furthermore advantageous embodiment, it has, on the principle shown in FIG. 4, separate networks IPN going continuously trough the material of the product, the networks being formed at least of the surface modified cellulose fiber substance 1 and the plastic substance 2.

Furthermore as an advantageous embodiment of the acoustic product according to the invention, the material of the product consists of surface modified cellulose fiber substance 1, plastic based substance 2, such as plastic particles, having a diameter smaller than ~1000 μm, and a compatibility improving agent 3, which substances may be processed together in order to produce a product according to the invention e.g. in a manner described in the following.

As a furthermore advantageous embodiment of the acoustic product according to the invention, its material comprises starch, filling agents, surface active agents, retention agents, dispersion agents, flotation agents and/or mixtures of the above in order to achieve the required characteristics of the product to be manufactured at any given time.

As a furthermore advantageous embodiment of the acoustic product according to the invention, it has, within the limits defined by the acoustic characteristics required from the product to be manufactured, longer fibers and/or As a furthermore advantageous embodiment of the acoustic product according to the invention, its material contains nano filling substances, such as nano clay, nano silicate and/or nano carbon fiber agents together with nano cellulose.

In the manufacturing of the product according to the invention, the primary wall of the cellulose fiber substance is thus broken advantageously by wet grinding at least to the SR (Schopper Riegler) number value 25 in order to bring forward the fibrils in the secondary walls thereof enhancing the binding at least with each other (networking) and with the polymer of the cellulose fibers, and increasing the contact surface area thereof.

In this manner, by mixing and processing of the wet ground surface modified cellulose fiber substance 1 and the plastic based substance 2, such as by wet web formation and compounding or devolatilization or the like processing, is achieved a percolation going in the product being manufactured in the form of a continuous web (IPN/interpenetrating network) formed of the surface modified natural fibers 1. In this context, the percolation between the surface modified cellulose fibers 1 of the cellulose fiber substance is produced by arranging the weight portion of the cellulose fiber substance to 30-60% of the manufacturing material.

The manufacturing material used in the manufacturing of the product according to the invention is formed by mixing the surface modified cellulose fiber substance 1, the plastic based substance 2 and the compatibility improving agent 3 together, wherein in order to manufacture the product the mixture in question is dried mechanically by pressing and/or by heat in order to remove liquid, such as water therein. The amount of the compatibility improving agent 3 is typically 0.1-5% of the amount of surface modified cellulose fiber substance 1.

In the manufacturing of the product, the compatibility improving agent is added mechanically to the surface modified cellulose fiber substance 1 during the wet grinding thereof, wherein, also chemically surface modified cellulose fibers 1; 1' according to FIG. 3 are achieved.

With reference to the figure of the morphology of dry ground wood substance shown in FIG. 1a, e.g. a dry ground cellulose is horned, and it cannot be ground in any other way than by "cutting". The primary wall of a fiber cannot be broken by dry mixing and there are no microfibrils on the surface of the fiber powder (because they are at the secondary wall). FIG. 1b shows for its part a dry ground wood powder, which contains all the lignin and hemicellulose of the wood and which has, deviating from fiber-like, mostly round form.

In FIG. 5 is shown a diagram of the plane and depth strength of a compounded fiber network being put together with two different fiber orientations (MD:CD/4.0 & MD:CD/1.1) from the same composite material. Both diagrams of the tests being the grounds for this diagram represent a 100% percolation, wherein the upper elliptic shape represents a strong fiber orientation, wherein the mechanical characteristics along the direction of the orientation are significantly greater than the same in transverse direction. Respectively, the lower, clearly more circle shaped figure than the one described above, shows that by fading out the orientation, mechanical characteristics can be achieved practically equal in all directions. Because the mechanical characteristics of the fiber network correlate directly with the propagation of sound, it can be seen that by eliminating the orientation, the propagation of sound may be directed in all directions in the fiber network practically at the same speed. This also applies for the part of the isotropy of a composite material having two separate IPN-networks.

According to the application publication on wet web formation technique explained in the beginning, in the manufacturing of the product according to the invention it is possible to utilize as the compatibility improving agent 3 a substance that enhances adhesion between the plastic and the modified cellulose fibers, which is compatible and/or reactive with plastic and reactive groups of plastic and natural fibers. Therefore in the compatibility improving agent may have at least one reactive group, which is compatible and/or reactive with a hydrophilic substance, such as cellulose and reactive groups of polymer.

Furthermore it is possible to use e.g. the maleic anhydrides (such as SMA), maleic acid grafted polymers, polybutadienes, polymethyl-methacrylates (PMMA), EVA, their derivatives and their mixtures as the compatibility improving agent. The compatibility improving polymers can be copolymers that contain groups that are compatible and/or reactive with hydrophilic natural fibers as well as groups that are compatible and/or reactive with hydrophobic plastics. Also other molecules with respective characteristics can be used in the compatibilization. Furthermore it is possible to utilize the compatibility improving agent in a powder-like, liquid and/or polymer-like form.

Furthermore in the application publication US 2012/0090800 explained in the beginning that is directed to the wet web formation there has been listed other substance substitutes for the part of the cellulose fiber substance and plastic substance to be used in the manufacturing of the product according to the invention.

In the manufacturing of the product according to the invention, a surface modified cellulose fiber substance based composite material is being used advantageously e.g. in AM (Additive Manufacturing) technique i.e. a manufacturing based on adding of material, such as 3D-printing, furthermore advantageously by using especially nano cellulose reinforced and/or cellulose based, nano whisker reinforced composites.

It is clear that the invention is not limited to the embodiments presented or described above, but instead it can be naturally modified within the basic idea of the invention e.g. according to the use purpose of the composite material products being manufactured at any given time.

In the manufacturing of a product according to the invention it is possible, if necessary, to include additives, such as e.g. starch, filling agents, surface active agents, retention agents, dispergator agents, foam inhibitor agents and the mixtures of the above, into the composite product being manufactured. These types of agents can be added e.g. in connection with the formation of the web by adding such ingredients into a liquid mixture, in which case the manufactured composite material contains the necessary ingredients already also with a view to possible further processing applications and end product embodiments. The invention furthermore enables e.g. other acoustic "tailoring" of the product to be manufactured, such as e.g. the tuning of the resonance frequency into a desired frequency area etc. In the product according to the invention, it is also possible to utilize longer fibers and/or metal, ceramic, natural mineral components etc. within the limits determined by the acoustic characteristics required thereof.

The invention claimed is:

1. An acoustic product composed of composite material, which is manufactured from raw material, comprising:
at least a cellulose based substance and a plastic based substance, by means of a thermoplastic process, including one or more of pressing, compression molding, injection molding, extrusion, blow molding by heat, rotational molding, the acoustic product having a material composition including a fiber substance based on surface modified cellulose and a plastic based substance in which orientation of the material is faded out, wherein the product has an isotropic sound propagation in three dimensions, and a space, being left between the surface modified cellulose fibers in the material, filled with plastic substance that forms a continuous interpenetrating network (IPN).

2. An acoustic product according to claim 1, comprising a percolation that at least partly goes through its material in the form of the continuous IPN formed by the surface modified cellulose fibers.

3. An acoustic product according to claim 1, comprising separate IPNs going continuously through the material of the product, the networks being formed at least of the surface modified cellulose fiber substance and the plastic substance.

4. An acoustic product according to claim 1, wherein the material of the product includes a surface modified cellulose fiber substance, a plastic based substance, including plastic particles, having a diameter smaller than ~1000 μm, and a compatibility improving agent.

5. An acoustic product according to claim 1, comprising one or more of starch, filling agents, surface active agents, retention agents, dispersion agents, flotation agents and mixtures thereof.

6. An acoustic product according to claim 1, comprising, within the limits determined by the acoustic characteristics required of the product to be manufactured, longer fibers and/or metal, ceramic, natural mineral components.

7. An acoustic product according to claim 1, wherein the material contains nano filling substances, including one or more of nano clay, nano silicate and/or nano carbon fiber agents together with nano cellulose.

8. An acoustic product comprising a composite material, the composite material comprising:
a cellulose based substance;
a plastic based substance;
wherein an orientation of the cellulose based substance is arranged to fade out and provide acoustic characteristics that are acoustically isotropic and proportionally propagated in three dimensions; and
a space, being left between fibers in the cellulose based substance, filled with the plastic substance that forms a continuous interpenetrating network (IPN).

9. The acoustic product according to claim 8, wherein the composite material includes one or more of a compression molded structure, an injection molded structure, an extruded structure, a blow molded structure, and a rotational molded structure.

10. The acoustic product according to claim 8, wherein the cellulose based substance include a surface modified cellulose fibers.

11. The acoustic product according to claim 10, wherein the composite material comprises the continuous IPN formed by the surface modified cellulose fibers.

12. The acoustic product according to claim 8, wherein the cellulose based substance and the plastic based substance form separate IPNs going continuously through the composite material.

13. The acoustic product according to claim 8, wherein the plastic based substance includes plastic particles, having a diameter smaller than about 1000 μm.

14. The acoustic product according to claim 13, wherein the plastic based substance further includes a compatibility improving agent.

15. The acoustic product according claim 8, wherein the composite material further comprises one or more of starch, filling agents, surface active agents, retention agents, dispersion agents, flotation agents, and mixtures thereof.

16. The acoustic product according to claim 8, wherein the composite material further comprises one or more of longer fibers, metal components, ceramic components, and natural mineral components, within the limits determined by the acoustic characteristics required of the acoustic product.

17. The acoustic product according to claim 8, wherein the composite material further comprises one or more of nano clay, nano silicate, nano carbon fiber agents, nano cellulose, and mixtures thereof.

* * * * *